(12) United States Patent
Hughes et al.

(10) Patent No.: US 7,610,296 B2
(45) Date of Patent: Oct. 27, 2009

(54) PRIORITIZED FILES

(75) Inventors: Aidan T. Hughes, Bellevue, WA (US); Paul C. Barr, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 429 days.

(21) Appl. No.: 11/015,821

(22) Filed: Dec. 17, 2004

(65) Prior Publication Data
US 2006/0136446 A1 Jun. 22, 2006

(51) Int. Cl.
*G06F 17/00* (2006.01)

(52) U.S. Cl. ............... 707/101; 707/10; 707/104.1; 707/204

(58) Field of Classification Search ............ 707/2, 707/204, 206, 10, 101, 104.1; 711/154
See application file for complete search history.

(56) References Cited

U.S. PATENT DOCUMENTS

| | | | | |
|---|---|---|---|---|
| 5,559,984 A | * | 9/1996 | Nakano et al. | 707/2 |
| 7,020,668 B2 | * | 3/2006 | Matsuda et al. | 707/204 |
| 2003/0097532 A1 | * | 5/2003 | Montgomery | 711/154 |
| 2003/0163449 A1 | * | 8/2003 | Iwano et al. | 707/1 |
| 2003/0202525 A1 | * | 10/2003 | Nagatomo | 370/411 |
| 2004/0098750 A1 | * | 5/2004 | Kim | 725/113 |
| 2004/0172476 A1 | * | 9/2004 | Chapweske | 709/231 |
| 2005/0273476 A1 | * | 12/2005 | Wertheimer et al. | 707/204 |
| 2006/0004698 A1 | * | 1/2006 | Pyhalammi et al. | 707/2 |

OTHER PUBLICATIONS

Viewer's Guide; How to activate and use your TiVo Service, Series 2; 2003, 155 pages.

* cited by examiner

*Primary Examiner*—Charles Rones
*Assistant Examiner*—Rezwanul Mahmood
(74) *Attorney, Agent, or Firm*—Lee & Hayes, PLLC

(57) ABSTRACT

An entry for a file to be stored in a file system can be created. A priority is assigned to the file that indicates an importance of the file relative to a plurality of additional files stored in the file system, the priority being one of three or more priorities available to files in the file system. Additionally, one or more of the files that are associated with the lowest priority values can be automatically deleted.

35 Claims, 5 Drawing Sheets

PRIORITIZED FILES

TECHNICAL FIELD

This invention relates to file systems and file storage, and particularly to prioritized files.

BACKGROUND

Computer software and hardware technology is continually advancing, resulting in increasingly powerful and feature-rich software programs for use by consumers. Accompanying this increase in performance and features, however, has also been an increase in the size of software programs as well as the size of data files for these software programs, particularly when data files storing audio and/or video data are considered. Furthermore, these software programs, as well as the operating systems on which they run, sometimes create large cache data files in order to increase their performance. All of these different software programs, operating systems, and data files are stored on a storage device of the computer. Thus, even though technological advances have increased the capacities of storage devices, storage space is still a concern.

Such storage space concerns are perhaps even more important when considering some of the small storage devices that have become increasingly popular, such as Universal Serial Bus (USB) flash memory devices. These small storage devices are easy to use and convenient to carry, but also generally have less storage capacity than the hard drives on the computers to which they are coupled.

Thus, users can still be faced with situations where, due to large program and data files already stored on a storage device, they are unable to store their desired data on the storage device.

Therefore, it would be beneficial to have improved file storage techniques to reduce the occurrence of these situations.

SUMMARY

Prioritized files are described herein.

In accordance with certain aspects, an entry for a file to be stored in a file system is created. A priority is assigned to the file that indicates an importance of the file relative to a plurality of additional files stored in the file system, the priority being one of three or more priorities available to files in the file system.

In accordance with other aspects, a data entry for a file stored on a storage device is accessed. A priority value for the file is obtained from the data entry, wherein multiple other files stored on the storage device have a different one of a plurality of priority values, and wherein each of the plurality of priority values is different than the priority value for the file.

In accordance with other aspects, a priority value associated with each of a plurality of files stored on a storage device is maintained. One or more of the plurality of files associated with the lowest priority values are automatically deleted.

BRIEF DESCRIPTION OF THE DRAWINGS

The same numbers are used throughout the document to reference like components and/or features.

DETAILED DESCRIPTION

Prioritized files are described herein. Files stored on one or more storage devices of a computer are assigned different priority values based on the types of the files. The priority value for a particular file identifies the priority of that file relative to the other files stored on the storage device(s).

Figure 1:
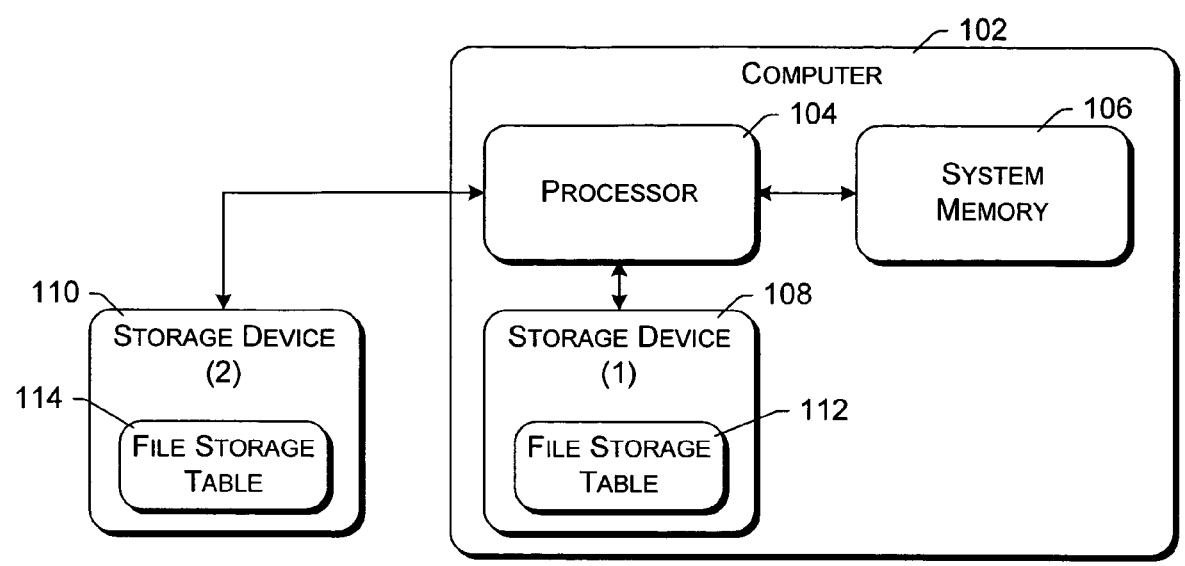
FIG. 1 is a block diagram illustrating an example environment in which the prioritized files can be used.

FIG. 1 is a block diagram illustrating an example environment in which the prioritized files can be used. A computer 102 includes a processor 104, system memory 106, internal storage device 108, and can be coupled to external storage device 110. Processor 104 can communicate directly with system memory 106 and storage devices 108 and 110, or alternatively may communicate with memory 106 and/or devices 108 and 110 via one or more intermediaries or controllers. Typically, one or more buses are included in computer 102 to allow processor 104 to communicate with system memory 106 and storage devices 108 and 110.

Computer 102 can be any of a variety of computing devices that access files stored on storage devices. Examples of computer 102 include desktop computers, server computers, laptop or notebook computers, handheld computers, personal digital assistants (PDAs), gaming consoles, and so forth.

Processor 104 can be any of a variety of one or more processors or controllers that can execute instructions from system memory 106. System memory 106 includes read only memory (ROM) and/or random access memory (RAM). In the case of random access memory, the instructions can be copied into system memory 106 from storage device 108 or 110, or alternatively some other source (e.g., over a network).

In alternate embodiments, processor 104 can be a controller that is designed to operate in a particular manner without executing instructions from system memory 106. In such embodiments, system memory 106 need not be included in computer 102.

Storage device 108 is a computer storage media internal to computer 102. Storage device 108 can be, for example, a magnetic disk such as a hard disk, an optical disc, a solid state memory device such as a Flash memory device, and so forth. Although only one internal storage device 108 is illustrated in FIG. 1, computer 102 may alternatively include multiple internal storage devices 108.

Storage device 110 is a computer storage media external to computer 102. Storage device 110 is coupled to computer 102 to allow processor 104 to communicate with device 110. This coupling is performed using a public or proprietary connection protocol, and may include a wired and/or wireless coupling. Examples of such connection protocols include Universal Serial Bus (USB), IEEE 1394 (sometimes referred to as Firewire), Bluetooth, Personal Computer Memory Card International Association (PCMCIA), and so forth. Storage device 108 can be, for example, a magnetic disk (such as an external hard disk drive or a removable disk), an optical disk (such as a recordable or non-recordable CD or DVD), a solid state memory device (such as a removable USB Flash memory device), and so forth. Although only one external storage device 110 is illustrated in FIG. 1, computer 102 may be coupled to multiple external storage devices 110.

Each storage device 108 and 110 includes a file storage table, shown as tables 112 and 114 in FIG. 1. Typically, every storage device includes its own file storage table, although alternatively multiple storage devices may share a single file storage table. Each file storage table 112 and 114 includes one or more data entries (or simply referred to as entries), each entry being associated with one file stored on the respective storage device. Each file stored on storage device 110 has an associated entry in file storage table 114, and each file stored on storage device 108 has an associated entry in file storage table 112.

The file system structure employed by the operating system of computer 102 (and/or processor 104) may allow different directories or folders to be used. Different files can be assigned to different directories (also referred to as folders), thereby allowing a larger number of files to be more easily managed by the user of computer 102. In many situations, each directory on storage device 110 also has an associated entry in file storage table 114, and each directory on storage device 108 has an associated entry in file storage table 112.

File storage tables 112 and 114 store information describing the files and directories that are stored on their respective storage devices 108 and 110, with each entry in a file storage table including information describing a particular file stored on the storage device or directory on the storage device. Each entry may store the actual data describing a particular file or directory, or alternatively one or more pointers to locations (e.g., on the storage device or in system memory 106) where the data describing a particular file or directory can be obtained. The information stored in each entry can vary in different embodiments, but typically includes an identifier of the file, the location(s) on the storage device where the file is stored, and one or more attributes of the file.

Additionally, although file storage tables 112 and 114 are illustrated as part of storage devices 108 and 110, respectively, the data in tables 112 and 114 may also be maintained elsewhere in certain embodiments. For example, a cache area or fast-lookup area may be generated (e.g., as part of a boot process for computer 102, or as soon as storage device 110 is coupled to computer 102) in which certain values from tables 112 and 114 (e.g., the priority values) are maintained. During operation, this cache area or fast-lookup area would be accessed (e.g., when retrieving priority values for files, or when adding priority values for newly created files) for the priority values rather than table 112 and/or 114. This cache area or fast-lookup area would also be synchronized with tables 112 and 114, so any changes to the data in the cache area or fast-lookup area would be reflected in the tables 112 and 114. This cache area or fast-lookup area could be located on one of the storage devices, in system memory 106, or elsewhere.

Figure 2:
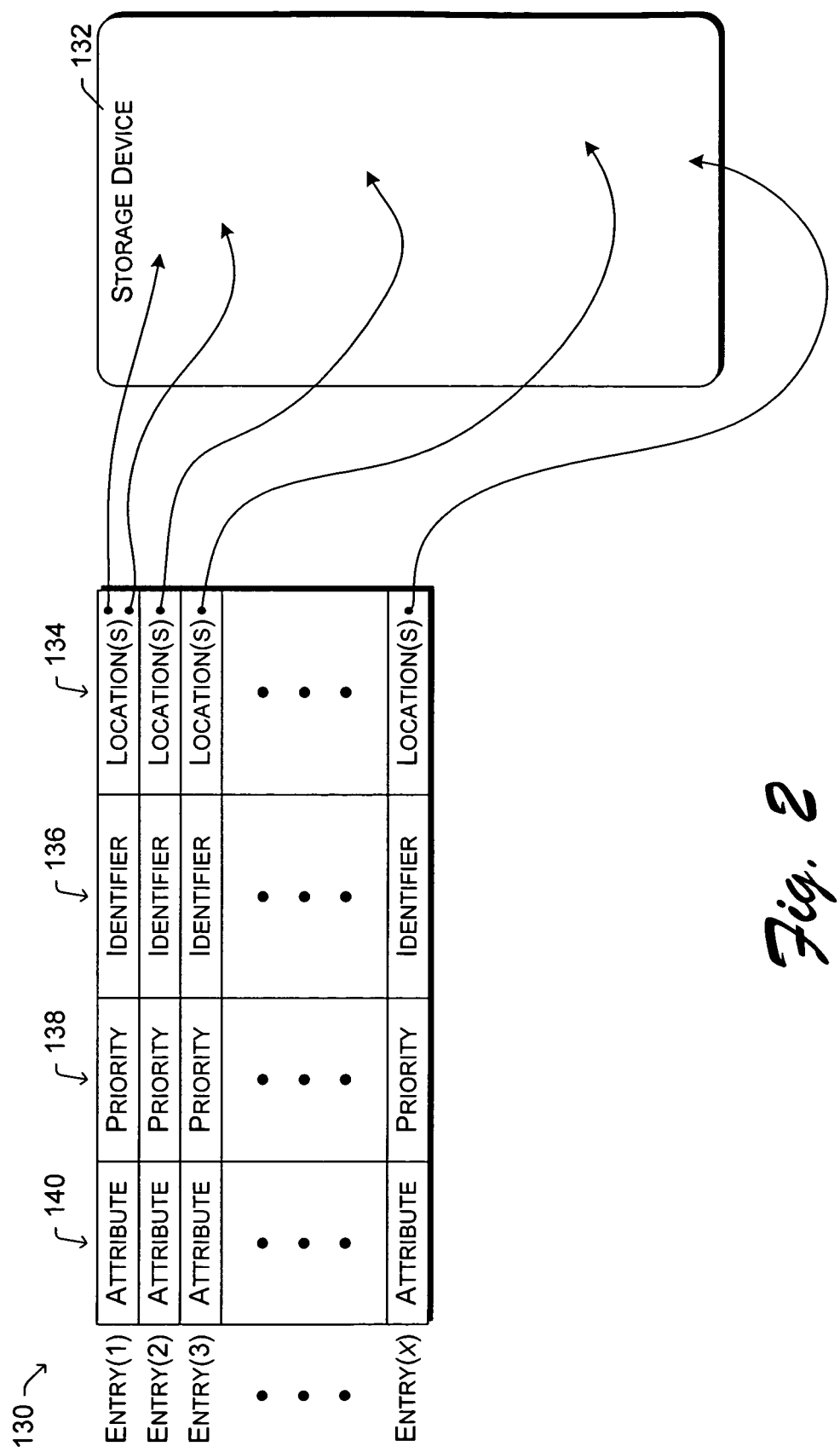
FIG. 2 illustrates an example file storage table in additional detail.

FIG. 2 illustrates an example file storage table in additional detail. A file storage table 130 is shown that is associated with a storage device 132. File storage table 130 can be, for example, file storage table 112 or 114 of FIG. 1, and storage device 132 can be, for example, storage device 108 or 110 of FIG. 1.

File storage table 130 includes, for each entry, a location(s) 134, an identifier 136, a priority value 138, and one or more additional attributes 140. Identifier 136 is an identifier of the file, such as a file name. Multiple identifiers or file names may be maintained, such as one file name that is used by the operating system in accessing the file and a second file name that is displayed to the user (e.g., allowing the user to enter a longer and more descriptive (to the user) file name).

Location(s) 134 on the storage device where the file is stored identifies the various physical location(s) on the storage device where the file is located. In many situations, storage devices 108 and 110 are separated into different portions. Location(s) 134 identifies the different portions of the storage devices where particular pieces of the file are stored. For example, a hard disk drive may have multiple platters each having two sides, and each side may be further separated into tracks each having multiple sectors. The actual file data may be spread out over two or more sectors, and the entry for the file in the file storage table identifies the particular platters, sides, tracks, and sectors where the file data is located.

Priority value 138 is an attribute that is used in supporting the prioritized files described herein. Priority value 138 identifies a priority for the file associated with the entry, indicating the importance of the file relative to other files stored on the storage device. Multiple files can have the same priority value, so the importance of the file relative to other files can indicate that the file is a higher priority, lower priority, or the same priority as each of the other files stored on the storage device.

The operating system running on computer 102 (and/or processor 104) that maintains the file storage tables also assigns the priority values to the files. Thus, the priority values can also be viewed as indicating the importance of the file relative to other files in the file system being used by the operating system (e.g., a higher priority, lower priority, or the same priority). Priority values 138 are typically assigned to file entries in table 130 but not assigned to directory entries in table 130, although alternatively priority values 138 could be assigned to directory entries in table 130.

Additional attributes 140 of the file include various metadata describing different characteristics of the file. These attributes can be a flag (e.g., a single bit) or alternatively multiple-bit values. Examples of such attributes include a flag that indicates whether the entry is associated with a file or a directory (also referred to as a folder), an archive flag that indicates whether the file has been changed since the file was last backed up, a flag that indicates whether the file is a system file (e.g., a file including instructions or data for the running of the operating system), a date and/or time when the file was created, a date and/or time when the file was last modified, a deleted flag that indicates whether the file has been deleted, and so forth.

Returning to FIG. 1, the file storage tables 112 and 114 are created by, and maintained by, the operating system running on computer 102. Alternatively, in embodiments, where computer 102 does not execute instructions from system memory 106, the tables 112 and 114 can be created by, and maintained by, processor 104. The exact nature and structure of file storage tables 112 and 114 can vary based on the particular operating system running on computer 102 and/or the particular processor 104. For example, in some versions of the Windows® operating system, such as the Windows® 98 operating system and the Windows® Me operating system, file storage tables 112 and 114 are each a File Allocation Table (FAT). By way of another example, in other versions of the Windows® operating system, such as the Windows® NT operating system and the Windows® XP operating system, file storage tables 112 and 114 are each a Master File Table (MFT).

Although discussed herein primarily as tables, any data structure(s) that maintain information about the files stored on storage devices 108 and 110 can be used as file storage tables 112 and 114. For example, a linked list of entries could be used, a database storing data in structures other than tables could be used, and so forth.

A storage device can store different types of files, including data files and non-data files. Data files refer to files which store data for use by one or more applications or by the operating system. Different types of data files can be included on a storage device, such as user-explicit data files, user-implicit data files, and system data files. In certain embodiments, all non-data files are treated as having a highest priority, while data files are treated as having the highest priority or one of multiple lower priorities (alternatively, the highest priority may be reserved for only non-data files). All files of the same type may have the same priority (e.g., all system data files may have the same priority), or alternatively different priorities (e.g., some system data files may have a higher priority than other system data files).

User-explicit data files include data that is generated directly by a user or at the user's request. Examples of user-explicit data files include files storing data describing a drawing created by the user, files storing data for a picture imported to the computer for the user, files storing data for a text document (such as a letter, report, paper, etc.) that the user is drafting, and so forth. User-explicit data files are typically data files that the user has specifically requested be generated, and thus typically have a higher priority than other types of data files.

User-implicit data files include data that is generated by the system for the user. These data files typically include customization and preferences data that is intended to improve the usability or user-friendliness of the computer to the user. The customization and preferences data can be generated automatically for the user or set manually by the user. Examples of user-implicit information include dictionary entries (e.g., data added to a spell-checking dictionary by the user), training files (e.g., for speech recognition programs or input method editors), program customization information (e.g., toolbar or menu bar display preferences), and so forth. Although such information is important to the user, it can be recreated or regenerated by the user as a byproduct of their use of the software, and thus is typically a lower priority than the user-explicit data files.

System data files include data that is generated or saved by the system to improve the performance or usability of the computer, and oftentimes is generated or saved without the user's knowledge. Examples of system data files are cache files that are generated in order to avoid having to re-generate particular information, system memory dump files that are created in response to a system crash to aid in problem identification and debugging, and so forth. For example, a font cache may be generated and stored as a file on the storage device so that the font information does not need to be re-calculated every time the computer is turned on, an Internet cache may store files that are pages of data downloaded from a server over the Internet so that they can be subsequently displayed from the computer rather than being re-downloaded, items from a Start Menu (e.g., in certain Windows® operating systems) may be cached, and so forth. As the system data files can be recreated or otherwise re-obtained by the computer, they are typically a lower priority than either the user-explicit data files or the user-implicit data files.

Non-data files include files with instructions to be executed by the computer for running a program(s), as well as any program information files that are necessary in order for the program to be run. Examples of such program information files include files with setting or configuration information that is needed by the program when it executes. Program information files are different from the user-explicit data files, user-implicit data files, and system data files because they include information that is necessary for the program to run and cannot be re-generated or easily re-obtained by the computer.

The priority values assigned to files and maintained in the file storage tables can follow any of a variety of schemes for identifying priorities. For example, a numerical scheme may be used with larger numbers indicating a higher priority than smaller numbers (or alternatively with smaller numbers indicating a higher priority than larger numbers), such as a scale from 0 to 100 with 100 being the highest priority and 0 being the lowest priority. By way of another example, a set of alphanumeric character sequences can be used for the different priority values, with the priority of the different character sequences being pre-assigned, such as a scale of A, B, C, D, and E, with A being the highest priority and E being the lowest priority, or such as a scale of "Very High", "High", "Average", "Low", and "Very Low", with "Very High" being the highest priority and "Very Low" being the lowest priority.

The particular priority values to be assigned to particular files can be set by the operating system in different manners. In certain embodiments, the operating system has default priority values for non-data files, user-explicit data files, user-implicit data files, and system data files. When a new file is created, the operating system automatically assigns the appropriate one of these default priority values to the file.

Priority values may alternatively be assigned in different manners. For example, program designers or developers may assign their own priority values to the data files that they generate. These priority values can then be included in the application and passed to the operating system when the application requests that the operating system create the file. The operating system can then assign to a file the priority value it receives from a particular application requesting that that file be created. The operating system may optionally check the priority value it receives from the application to ensure that it is within a particular range, or does not exceed an upper threshold (e.g., to ensure that the priority value is not greater than the priority values of non-data files) or fall below a lower threshold (e.g., to ensure that the priority value is not less than the priority values of system data files).

By way of another example, priority values may also be set or modified by a user. These user-set priority values would then be assigned by the operating system when opening files. A user could, for example, input his or her preferences as to which types of files are more important to him or her. For example, the user may decide that user-implicit data files are less important than system data files and change the priority values accordingly. Priority values can be set by the user in different ways. For example, the user may select the priority value for a particular type of file from a list of possible priority values or by data input into a data entry field. By way of another example, the operating system may present the user with a variety of different scenarios describing different types of data and let the user select which type of data is more important to him or her (or indicate that they are of equal importance). Based on the results of these selections, the operating system can generate appropriate priority values that reflect the importance of these types as indicated by the user.

Figure 3:
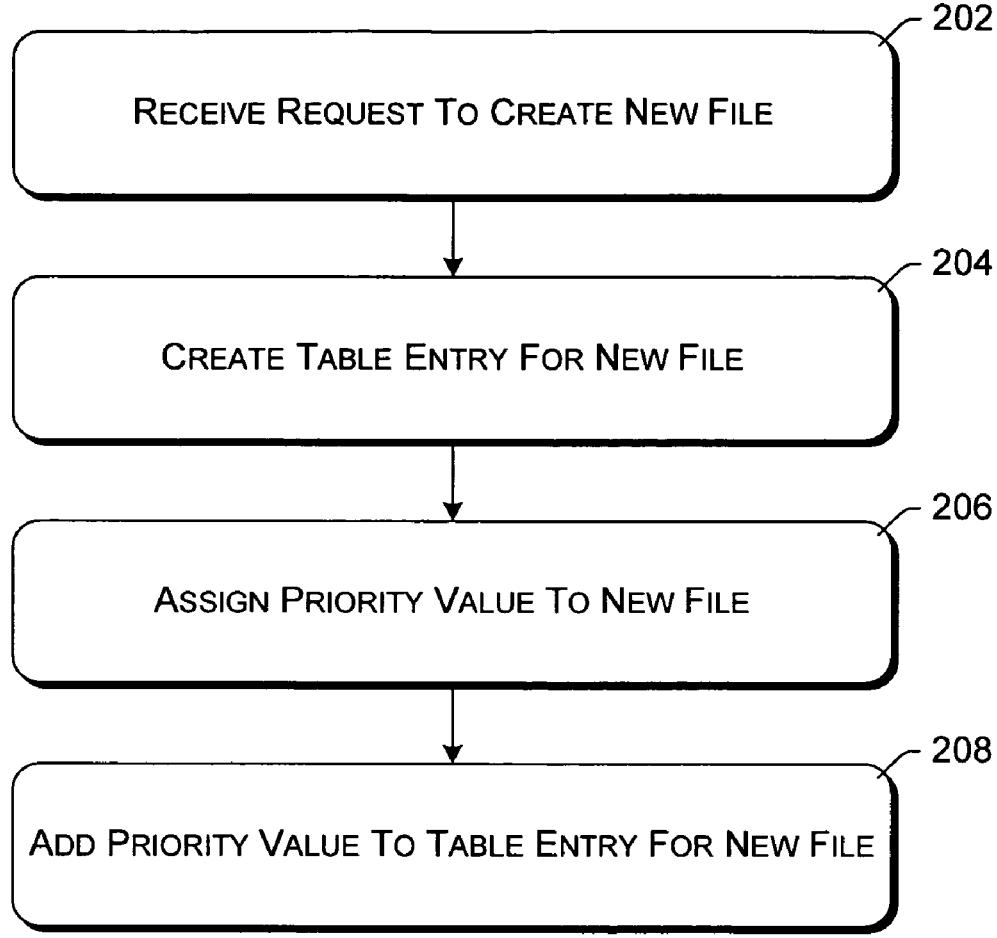
FIG. 3 is a flowchart illustrating an example process for generating file storage table entries with priorities.

FIG. 3 is a flowchart illustrating an example process 200 for generating file storage table entries with priorities. Process 200 is performed by an operating system running on a computer, such as computer 102 of FIG. 1, although process 200 may alternatively be performed by a processor or controller that is not executing an operating system. Process 200 may be implemented in software, hardware, firmware, or combinations thereof.

Initially, a request to create a new file is received (act 202). This request may be received, for example, from an application running on the same computer as the operating system or alternatively from a component of the operating system. In response to the request, an entry in the file storage table is created for the new file (act 204). The entry includes an identifier of the file and location(s) for the file, as discussed above.

A priority value is also assigned to the new file (act 206). The priority value can be assigned to the new file in different manners. The operating system may be programmed, or know where to obtain, the different priority values that may be assigned and under what conditions (e.g., for which file types) they are to be assigned. Based on the component or application that is requesting that the file be created, an appropriate priority value can be assigned. For example, if the request is received from another application, then the file would not be a system data file. By way of another example, if the file being created is stored in a particular folder or directory that is known to the operating system to typically store user data files (e.g., the "My Documents" folder in some of the Windows® operating systems), then the file would be a user-explicit data file. Additionally, information received from the component or application regarding the file (e.g., whether the file is being created in response to a request from the user to create the file, or is being created automatically by the application for the user) may also be used by the operating system in assigning the priority value. For example, the component or application would provide an indication to the operating system of what specific type of data file is being created (e.g., a user-implicit data file or a user-explicit data file).

Alternatively, the component of the operating system or the application that is requesting that the file be created may send the particular priority value that is to be assigned to the file. This priority value could be included as part of the request, or alternatively communicated to the operating system in some other manner.

Once the appropriate priority value is assigned to the file, the priority value is added to the file storage table entry that is associated with the new file (act 208). The priority is now part of the file storage table and is accessible to the operating system to determine the priority of the newly created file relative to the other files on the same storage device.

It should be noted that the priority values can also be used to identify the priorities of files relative to other files having different priority values in the file system being used by the operating system, including files on other storage devices. For example, referring back to FIG. 1, the priority value assigned to a file stored on storage device 108 can be used to identify the priority of the file relative to other files stored on storage device 108 as well as storage device 110.

Returning to FIG. 1, various functionality can be offered by computer 102, typically by the operating system running on computer 102, by making use of the priority values maintained in the file storage tables.

One example functionality that can be offered by the operating system is to maintain old versions of user-explicit data files on the storage device. A new version of a file can be saved each time the user closes the file or closes the application that is using the file, or alternatively every time the user selects a "save" button. For example, the Microsoft® Word word processing application may be running with a data file called "My Report.doc" open. Every time the user selects a "save" option in the word processing application, the operating system saves a new version of "My Report.doc" as a new file rather than overwriting the current file. Old versions of the user-explicit data files can thus be maintained by the operating system, and these old versions can have low priorities. The operating system can then automatically delete these old versions when requested by the user, or can delete these old versions automatically under certain circumstances (such as a certain amount of time passing, or the available space on the storage device becoming too low as discussed in more detail below). Alternatively, the operating system could use 'copy on write' semantics which causes changed parts of a file to be written to a new location with unchanged parts remaining untouched. The operating system's default view of the file shows the most recent version. Old versions of these "changed parts" files can have low priorities, and can be automatically deleted by the operating system as discussed above (e.g., when requested by the user or under certain circumstances).

Another example functionality that can be offered by the operating system is to have an automated cleanup process that automatically deletes low-priority files as appropriate. Such an automated cleanup process would operate to keep at least a certain amount of storage space available on a storage device, and may optionally be used in conjunction with maintaining old versions of files in order to ensure that the old versions do not prevent other files from being created and stored on the storage device.

Figure 4:
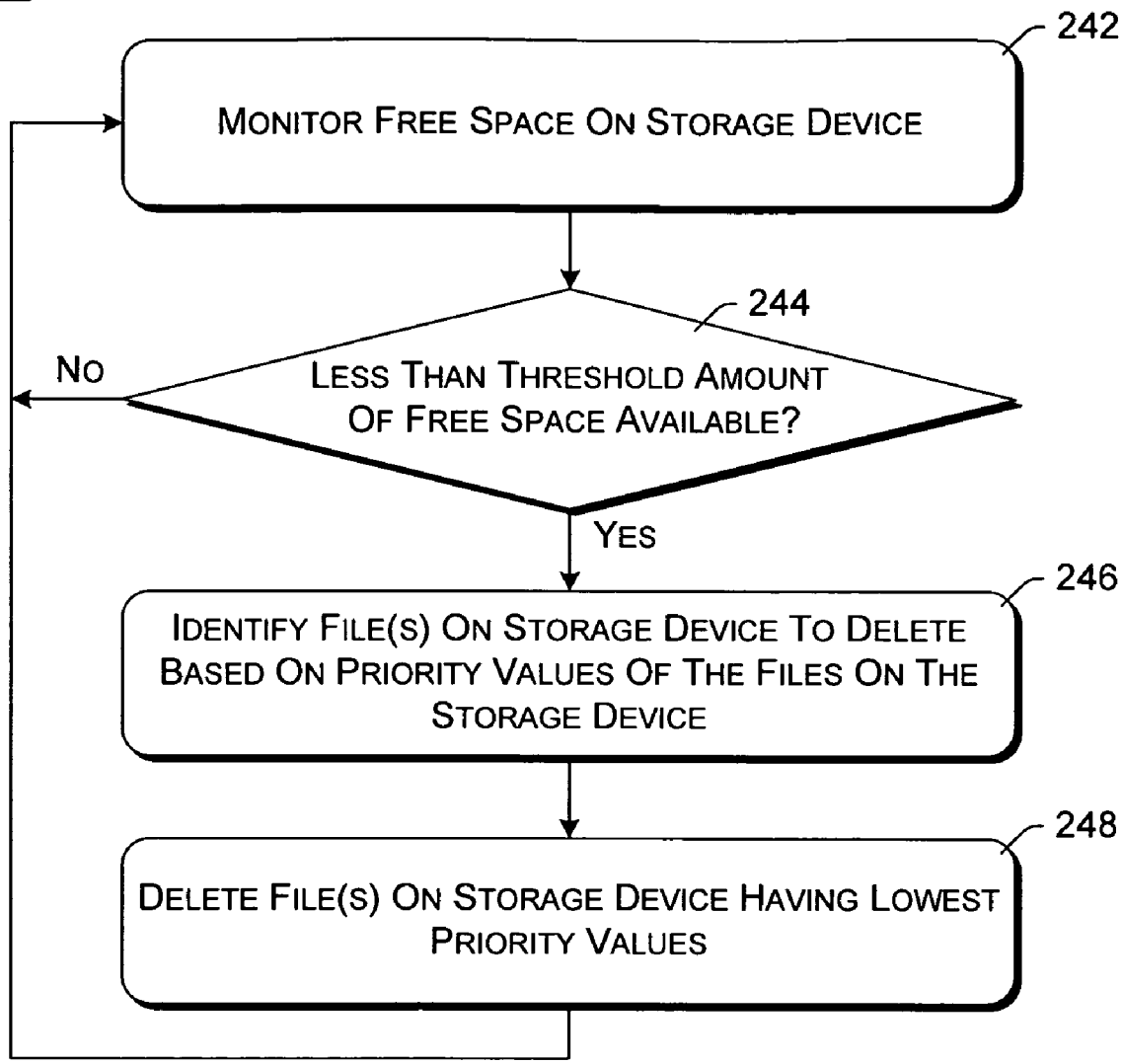
FIG. 4 is a flowchart illustrating an example automated cleanup process.

FIG. 4 is a flowchart illustrating an example automated cleanup process 240. Process 240 is performed by an operating system running on a computer, such as computer 102 of FIG. 1, although process 240 may alternatively be performed by a processor or controller that is not executing an operating system. Process 240 may be implemented in software, hardware, firmware, or combinations thereof.

Initially, free space on the storage device is monitored (act 242). This free space refers to space on the storage device that is available for storing data, as no non-deleted data currently resides there. As is known to those skilled in the art, in many operating systems when a file is deleted, the file is no longer listed as an available file in the file storage table, but the actual data for that file may still be stored on the storage device. The entry for the deleted file may be removed from the file storage table, or the entry may remain in the file storage table but with a deleted flag set to indicate that the file has been deleted. Thus, although the data may still be on the storage device and an entry for the deleted file may be present in the file storage table, the file has been deleted so that portion of the storage device where the data is stored is considered to be free space.

A check is made by the operating system as to whether there is less than a threshold amount of free space available (act 244). This check can be performed in response to a certain event, such as the writing of a new file or a modified file to the storage device, or alternatively may be performed by the operating system at regular or irregular intervals. The threshold amount of free space may be set as a particular value (e.g., three megabytes), or as a percentage of the overall capacity of the storage device (e.g., 3% of the total storage device capacity, so that the threshold would be 3 megabytes on a 100 megabyte storage device, and 30 megabytes on a 1 gigabyte storage device).

If there is not less than the threshold amount of free space available, then the monitoring continues (act 242). However, if there is less than the threshold amount of free space available, then one or more files on the storage device are identified for deletion based on the priority values of the files on the storage device (act 246). The file(s) on the storage device having the lowest priority values are deleted (act 248), and the monitoring continues (act 242).

One or more files may be identified and deleted in acts 246 and 248. In certain embodiments, the lowest priority file is identified for deletion and increasingly higher priority files are identified for deletion as necessary until enough files are identified for deletion so that the amount of free space is no longer below the threshold. All of these identified files are deleted in act 248. Alternatively, acts 244, 246, and 248 may be repeated, with a single file being deleted each pass through acts 244, 246, and 248 until it is determined in act 244 that the amount of free space is no longer below the threshold amount.

In determining whether less than the threshold amount of free space is available in act 244, in certain embodiments the determination takes into account the size of any new file being written to the storage device. For example, if a five megabyte file were going to be written to a storage device, and after writing the five megabyte file the available free space on the storage device would be less than the threshold amount, then sufficient low priority files are deleted so that after the five megabyte file is written to the storage device the amount of free space is still not less than the threshold amount. Alternatively, the determination in act 244 may not take into account the size of any new file being written to the storage device.

It should be noted that in certain situations, multiple files may have the same lowest priority value. In such situations, all the files having the same lowest priority value may be identified for deletion in act 246, or alternatively certain additional criteria may be used so that only some of the files are identified for deletion in act 246. For example, one or more of the files may be randomly selected, files may be selected by checking the last modified or created dates of the files and identifying the oldest files or least recently modified files, the files may be selected based on the sizes of the files (e.g., determining the fewest files that could be deleted so that not less than the threshold amount of free space is available), and so forth.

It should also be noted that only files having less than a particular priority value may be identified and deleted in acts 246 and 248. This particular priority value can be set, for example, to ensure that no user-explicit data files or non-data files are deleted by process 240. If there are insufficient files having less than this particular priority value that can be deleted in order to make room for a new file, then an error can be signaled to the user (e.g., that there is insufficient space on the storage device).

Additionally, rather than deleting files in act 248, in certain embodiments the identified files may be transferred to another storage device. For example, a computer may include multiple storage devices with one being larger but slower than the other. When the smaller and faster storage device has less than the threshold amount of free space available, the files identified in act 246 are moved to the larger and slower storage device so that they are still available to the computer even though they are deleted from the smaller and faster storage device.

Figure 5:
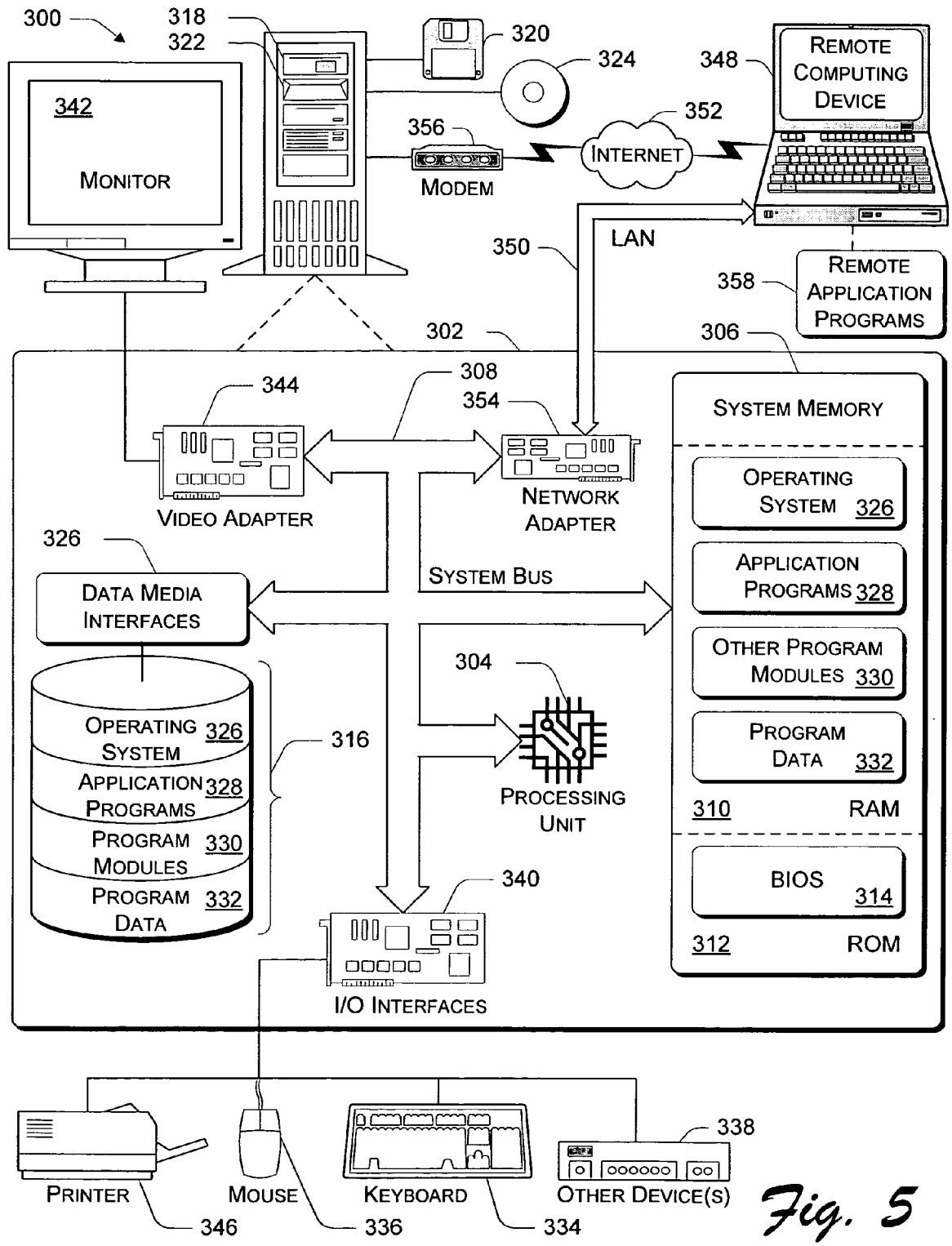
FIG. 5 illustrates an example general computer environment in which the prioritized files described herein can be used.

FIG. 5 illustrates a general computer environment 300 in which the prioritized files described herein can be used. The computer environment 300 is only one example of a computing environment and is not intended to suggest any limitation as to the scope of use or functionality of the computer and network architectures. Neither should the computer environment 300 be interpreted as having any dependency or requirement relating to any one or combination of components illustrated in the exemplary computer environment 300.

Computer environment 300 includes a general-purpose computing device in the form of a computer 302. Computer 302 can be, for example, a computer 102 of FIG. 1. The components of computer 302 can include, but are not limited to, one or more processors or processing units 304, a system memory 306, and a system bus 308 that couples various system components including the processor 304 to the system memory 306.

The system bus 308 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 302 typically includes a variety of computer readable media. Such media can be any available media that is accessible by computer 302 and includes both volatile and non-volatile media, removable and non-removable media.

The system memory 306 includes computer readable media in the form of volatile memory, such as random access memory (RAM) 310, and/or non-volatile memory, such as read only memory (ROM) 312. A basic input/output system (BIOS) 314, containing the basic routines that help to transfer information between elements within computer 302, such as during start-up, is stored in ROM 312. RAM 310 typically contains data and/or program modules that are immediately accessible to and/or presently operated on by the processing unit 304.

Computer 302 may also include other removable/non-removable, volatile/non-volatile computer storage media. By way of example, FIG. 5 illustrates a hard disk drive 316 for reading from and writing to a non-removable, non-volatile magnetic media (not shown), a magnetic disk drive 318 for reading from and writing to a removable, non-volatile magnetic disk 320 (e.g., a "floppy disk"), and an optical disk drive 322 for reading from and/or writing to a removable, non-volatile optical disk 324 such as a CD-ROM, DVD-ROM, or other optical media. The hard disk drive 316, magnetic disk drive 332, and optical disk drive 322 are each connected to the system bus 308 by one or more data media interfaces 326. Alternatively, the hard disk drive 316, magnetic disk drive 332, and optical disk drive 322 can be connected to the system bus 308 by one or more interfaces (not shown). Additional computer storage media may also be included as part of computer 302, such as a USB flash device coupled to computer 302.

The disk drives and their associated computer-readable media provide non-volatile storage of computer readable instructions, data structures, program modules, and other data for computer 302. Although the example illustrates a hard disk 316, a removable magnetic disk 320, and a removable optical disk 324, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 316, magnetic disk 320, optical disk 324, ROM 312, and/or RAM 310, including by way of example, an operating system 326, one or more application programs 328, other program modules 330, and program data 332. Each of such operating system 326, one or more application programs 328, other program modules 330, and program data 332 (or some combination thereof) may implement all or part of the resident components that support the distributed file system.

A user can enter commands and information into computer 302 via input devices such as a keyboard 334 and a pointing device 336 (e.g., a "mouse"). Other input devices 338 (not shown specifically) may include a microphone, joystick, game pad, satellite dish, serial port, scanner, and/or the like. These and other input devices are connected to the processing unit 304 via input/output interfaces 340 that are coupled to the system bus 308, but may be connected by other interface and bus structures, such as a parallel port, game port, a universal serial bus (USB), or a Firewire (IEEE 1394) bus.

A monitor 342 or other type of display device can also be connected to the system bus 308 via an interface, such as a video adapter 344. In addition to the monitor 342, other output peripheral devices can include components such as speakers (not shown) and a printer 346 which can be connected to computer 302 via the input/output interfaces 340.

Computer 302 can operate in a networked environment using logical connections to one or more remote computers, such as a remote computing device 348. By way of example, the remote computing device 348 can be a personal computer, portable computer, a server, a router, a network computer, a peer device or other common network node, and the like. The remote computing device 348 is illustrated as a portable computer that can include many or all of the elements and features described herein relative to computer 302.

Logical connections between computer 302 and the remote computer 348 are depicted as a local area network (LAN) 350 and a general wide area network (WAN) 352. Such networking environments are commonplace in offices, enterprise-wide computer networks, intranets, and the Internet.

When implemented in a LAN networking environment, the computer 302 is connected to a local network 350 via a network interface or adapter 354. When implemented in a WAN networking environment, the computer 302 typically includes a modem 356 or other means for establishing communications over the wide network 352. The modem 356, which can be internal or external to computer 302, can be connected to the system bus 308 via the input/output interfaces 340 or other appropriate mechanisms. It is to be appreciated that the illustrated network connections are exemplary and that other means of establishing communication link(s) between the computers 302 and 348 can be employed.

In a networked environment, such as that illustrated with computing environment 300, program modules depicted relative to the computer 302, or portions thereof, may be stored in a remote memory storage device. By way of example, remote application programs 358 reside on a memory device of remote computer 348. For purposes of illustration, application programs and other executable program components such as the operating system are illustrated herein as discrete blocks, although it is recognized that such programs and components reside at various times in different storage components of the computing device 302, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. One or more computer readable storage media having stored thereon a plurality of instructions that, when executed by one or more processors of a computer, causes the one or more processors to:

create an entry for a file to be stored in a file system; and assign a priority to the file that indicates an importance of the file relative to a plurality of additional files stored in the file system, the priority being one of four or more priorities available to files in the file system, wherein the assigned priority is determined based on whether the file comprises non-data, user-explicit data, user-implicit data, or system data;

wherein the four or more priorities include a first one or more priorities assigned to non-data, a second one or more priorities assigned to user-explicit data, a third one or more priorities assigned to user-implicit data, and a fourth one or more priorities assigned to system data, and wherein the non-data is a higher priority than the user-explicit data, the user-explicit data is a higher priority than the user-implicit data, and the user-implicit data is a higher priority than the system data;

wherein non-data comprises information required for a program to be executed by a computer, the user-explicit data comprises data that is generated directly by a user or at the user's request, the user-implicit data comprises customization or preference data that is generated for the user by a computing system of the user, and the system data comprises data that is generated or saved by the computing system, without knowledge of the user, to improve performance or usability of the computing system; and wherein the system data further comprises: (i) a cache file generated to avoid re-generation of particular information, and (ii) a system memory dump file created in response to a system crash to aid in problem identification and/or debugging.

2. The one or more computer readable storage media as recited in claim 1, wherein the plurality of instructions further cause the one or more processors to include the priority in the entry for the file.

3. The one or more computer readable storage media as recited in claim 1, wherein the entry further includes a date or time attribute identifying when the file was created.

4. The one or more computer readable storage media as recited in claim 1, wherein the entry further includes a date or time attribute identifying when the file was last modified.

5. The one or more computer readable storage media as recited in claim 1, wherein the entry further includes a deleted attribute identifying whether the file has been deleted.

6. The one or more computer readable storage media as recited in claim 1, wherein the entry is an entry in a file table maintained by an operating system executed by the one or more processors.

7. The one or more computer readable storage media as recited in claim 1, wherein the plurality of instructions are part of an operating system.

8. The one or more computer readable storage media as recited in claim 1, wherein the priority for the file is received from an application that requested that the file be created.

9. The one or more computer readable storage media as recited in claim 1, wherein the three or more priorities are selected by a user of the computer.

10. The one or more computer readable storage media as recited in claim 1, wherein the plurality of instructions further cause the one or more processors to automatically delete one or more of the plurality of additional files that are assigned the lowest priorities.

11. The one or more computer readable storage media as recited in claim 1, wherein the plurality of instructions further cause the one or more processors to automatically move one or more of the plurality of additional files that are assigned the lowest priorities from one storage device of the computer to another storage device.

12. A computer-implemented method comprising:
    accessing data describing a file stored on a storage device; and
    obtaining, from the data, a priority value for the file, wherein multiple files of a plurality of other files stored on the storage device have different ones of a plurality of priority values, wherein each of the plurality of priority values is different than the priority value for the file, and wherein the priority value for the file is determined based on whether the file comprises non-data, user-explicit data, user-implicit data, or system data;
    wherein a first one or more priorities are assigned to non-data, a second one or more priorities are assigned to user-explicit data, a third one or more priorities are assigned to user-implicit data, and a fourth one or more priorities are assigned to system data, and wherein the non-data is a higher priority than the user-explicit data, the user-explicit data is a higher priority than the user-implicit data, and the user-implicit data is a higher priority than the system data;
    wherein non-data comprises information required for a program to be executed by a computer, the user-explicit data comprises data that is generated directly by a user or at the user's request, the user-implicit data comprises customization or preference data that is generated for the user by a computing system of the user, and the system data comprises data that is generated or saved by the computing system to improve performance or usability of the computing system; and
    wherein the system data further comprises: (i) a cache file generated to avoid re-generation of particular information, and (ii) a system memory dump file created in response to a system crash to aid in problem identification and/or debugging.

13. The method as recited in claim 12, wherein the data further includes a date or time attribute identifying when the file was created.

14. The method as recited in claim 12, wherein the data further includes a date or time attribute identifying when the file was last modified.

15. The method as recited in claim 12, wherein the data further includes a deleted attribute identifying whether the file has been deleted.

16. The method as recited in claim 12, wherein the data describing the file is data included in a data entry of a file storage table.

17. The method as recited in claim 16, wherein the file storage table is maintained by an operating system being executed by one or more processors of a computer.

18. The method as recited in claim 12, further comprising automatically deleting one or more of the plurality of other files that are assigned the lowest priority values.

19. One or more computer readable storage media having stored thereon a plurality of instructions that, when executed by one or more processors, causes the one or more processors to:
    maintain, for each of a plurality of files stored on a storage device, a priority value associated with the file, wherein the priority value is determined based on whether the file comprises non-data, user-explicit data, user-implicit data, or system data; and
    automatically delete one or more of the plurality of files associated with the lowest priority values;
    wherein the priority values include a first one or more priority values assigned to non-data, a second one or more priority values assigned to user-explicit data, a third one or more priority values assigned to user-implicit data, and a fourth one or more priority values assigned to system data, and wherein the non-data is a higher priority than the user-explicit data, the user-explicit data is a higher priority than the user-implicit data, and the user-implicit data is a higher priority than the system data;
    wherein non-data comprises information required for a program to be executed by a computer, the user-explicit data comprises data that is generated directly by a user or at the user's request, the user-implicit data comprises customization or preference data that is generated for the user by a computing system of the user, and the system data comprises data that is generated or saved by the computing system to improve performance or usability of the computing system; and
    wherein the system data further comprises: (i) a cache file generated to avoid re-generation of particular information, and (ii) a system memory dump file created in response to a system crash to aid in problem identification and/or debugging.

20. The one or more computer readable storage media as recited in claim 19, wherein the plurality of instructions are part of an operating system.

21. The one or more computer readable storage media as recited in claim 19, wherein the one or more of the plurality of files are deleted when less than a threshold amount of free space remains on the storage device.

22. The one or more computer readable storage media as recited in claim 19, wherein the storage device comprises a hard disk included in a same computer as the one or more processors.

23. The one or more computer readable storage media as recited in claim 19, wherein the storage device comprises a portable flash memory device.

24. The one or more computer readable storage media as recited in claim 19, wherein the instructions further cause the one or more processors to maintain, for each of the plurality of files, a date or time attribute identifying when the file was created.

25. The one or more computer readable storage media as recited in claim 19, wherein the instructions further cause the one or more processors to maintain, for each of the plurality of files, a date or time attribute identifying when the file was last modified.

26. The one or more computer readable storage media as recited in claim 19, wherein the instructions further cause the one or more processors to maintain, for each of the plurality of files, a deleted attribute identifying whether the file has been deleted.

27. The one or more computer readable storage media as recited in claim 19, wherein the priority values are maintained in a file table by an operating system executed by the one or more processors.

28. The one or more computer readable storage media as recited in claim 19, wherein the plurality of instructions further cause the one or more processors to, prior to deletion of the one or more of the plurality of files associated with the lowest priority values, automatically copy the one or more of the plurality of files associated with the lowest priority values to another storage device.

29. A computer comprising:
a processor;
a storage device;
a system memory, coupled to the processor, to store instructions for execution by the processor, wherein the instructions cause the processor to:
access data describing a file stored on the storage device; and
obtain, from the data, a priority value for the file, wherein multiple files of a plurality of other files stored on the storage device have different ones of a plurality of priority values, each of the plurality of priority values being different than the priority value for the file, and wherein the priority value for the file is determined based on whether the file comprises non-data, user-explicit data, user-implicit data, or system data;
wherein a first one or more priorities are assigned to non-data, a second one or more priorities are assigned to user-explicit data, a third one or more priorities are assigned to user-implicit data, and a fourth one or more priorities are assigned to system data, and wherein the non-data is a higher priority than the user-explicit data, the user-explicit data is a higher priority than the user-implicit data, and the user-implicit data is a higher priority than the system data
wherein non-data comprises information required for a program to be executed by a computer, the user-explicit data comprises data that is generated directly by a user or at the user's request, the user-implicit data comprises customization or preference data that is generated for the user by a computing system of the user, and the system data comprises data that is generated or saved by the computing system to improve performance or usability of the computing system; and
wherein the system data further comprises: (i) a cache file generated to avoid re-generation of particular information, and (ii) a system memory dump file created in response to a system crash to aid in problem identification and/or debugging.

30. The computer as recited in claim 29, wherein the data further includes a date or time attribute identifying when the file was created.

31. The computer as recited in claim 29, wherein the data further includes a date or time attribute identifying when the file was last modified.

32. The computer as recited in claim 29, wherein the data further includes a deleted attribute identifying whether the file has been deleted.

33. The computer as recited in claim 29, wherein the data describing the file is data included in an entry in a file table maintained by an operating system of the computer.

34. The computer as recited in claim 29, wherein the instructions further cause the processor to automatically delete one or more of the plurality of other files that are assigned the lowest priorities.

35. The computer as recited in claim 29, wherein two or more of the plurality of files have the same one of the plurality of priority values.

\* \* \* \* \*